United States Patent
Freed et al.

(10) Patent No.: US 11,184,298 B2
(45) Date of Patent: Nov. 23, 2021

(54) METHODS AND SYSTEMS FOR IMPROVING CHATBOT INTENT TRAINING BY CORRELATING USER FEEDBACK PROVIDED SUBSEQUENT TO A FAILED RESPONSE TO AN INITIAL USER INTENT

(71) Applicant: INTERNATIONAL BUSINESS MACHINES CORPORATION, Armonk, NY (US)

(72) Inventors: Andrew Freed, Cary, NC (US); Aaron Smith, Raleigh, NC (US); Courtney Branson, Raleigh, NC (US); Sorabh Murgai, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 10 days.

(21) Appl. No.: 16/554,249

(22) Filed: Aug. 28, 2019

(65) Prior Publication Data

US 2021/0067470 A1    Mar. 4, 2021

(51) Int. Cl.
*H04L 12/58*    (2006.01)
*G10L 15/22*    (2006.01)
*G06K 9/62*    (2006.01)

(52) U.S. Cl.
CPC ............ *H04L 51/02* (2013.01); *G06K 9/6218* (2013.01); *G10L 15/22* (2013.01); *G10L 2015/223* (2013.01)

(58) Field of Classification Search
CPC ... H04L 51/02; G10L 15/22; G10L 2015/223; G06K 9/6218
See application file for complete search history.

(56) References Cited

U.S. PATENT DOCUMENTS

| | | | | |
|---|---|---|---|---|
| 9,355,360 | B2* | 5/2016 | Welinder | G06F 16/24573 |
| 9,679,568 | B1* | 6/2017 | Taubman | G10L 15/22 |
| 9,866,693 | B2* | 1/2018 | Tamblyn | H04L 51/14 |
| 10,083,006 | B1* | 9/2018 | Feuz | G06F 3/167 |
| 10,148,600 | B1* | 12/2018 | White | H04L 51/02 |
| 10,229,680 | B1* | 3/2019 | Gillespie | G06F 40/295 |
| 10,303,715 | B2* | 5/2019 | Graham | G06F 9/453 |
| 10,496,905 | B2* | 12/2019 | Solomon | A61B 5/1113 |
| 10,515,625 | B1* | 12/2019 | Metallinou | G10L 15/1822 |

(Continued)

FOREIGN PATENT DOCUMENTS

CN    108363690 A    8/2018

OTHER PUBLICATIONS

"Cognitive System Intent Classification Tool"—https://priorart.ip.com/IPCOM/000254884 (2 Pages).

*Primary Examiner* — Jerry B Dennison
(74) *Attorney, Agent, or Firm* — Griffiths & Seaton PLLC

(57) ABSTRACT

Embodiments for managing chatbots are provided. Chatbot interaction information is received. At least one chatbot interaction within the received chatbot interaction information is identified. The at least one identified chatbot interaction includes an initial utterance provided by a user, an unsuccessful response generated responsive to the initial utterance, a subsequent utterance provided by the user, and a successful response generated responsive to the subsequent utterance. The successful response is associated with a chatbot intent. A confidence score for associating the initial utterance with utilization of the chatbot intent by a chatbot is calculated.

18 Claims, 6 Drawing Sheets

(56) References Cited

U.S. PATENT DOCUMENTS

| | | | |
|---|---|---|---|
| 10,546,574 B2* | 1/2020 | Kim | G10L 15/1815 |
| 10,601,740 B1* | 3/2020 | Harding | H04L 51/02 |
| 10,617,959 B2* | 4/2020 | Liu | H04L 51/02 |
| 10,621,976 B2* | 4/2020 | Ugrani | G06F 40/30 |
| 10,645,035 B2* | 5/2020 | Nowak-Przygodzki | H04L 65/403 |
| 10,679,000 B2* | 6/2020 | Hirzel | G06F 40/35 |
| 10,691,897 B1* | 6/2020 | Rajagopal | G06F 40/247 |
| 10,699,215 B2* | 6/2020 | Devarakonda | G06N 20/00 |
| 10,706,843 B1* | 7/2020 | Elangovan | H04L 61/1594 |
| 10,798,245 B2* | 10/2020 | Kannan | H04M 3/5166 |
| 2005/0105712 A1* | 5/2005 | Williams | H04M 3/5166 379/265.02 |
| 2011/0131045 A1* | 6/2011 | Cristo | G10L 15/26 704/249 |
| 2013/0346409 A1* | 12/2013 | Welinder | G06F 16/215 707/737 |
| 2015/0178371 A1* | 6/2015 | Seth | G06F 16/3329 707/748 |
| 2015/0179170 A1* | 6/2015 | Sarikaya | G10L 15/1822 704/275 |
| 2016/0225370 A1* | 8/2016 | Kannan | G10L 15/005 |
| 2016/0275418 A1* | 9/2016 | Welinder | G06F 16/215 |
| 2017/0324866 A1* | 11/2017 | Segre | H04L 51/046 |
| 2017/0324868 A1* | 11/2017 | Tamblyn | H04M 3/58 |
| 2018/0061394 A1* | 3/2018 | Kim | G10L 15/22 |
| 2018/0061408 A1* | 3/2018 | Andreas | G10L 15/063 |
| 2018/0068031 A1* | 3/2018 | Hewavitharana | G06F 16/3329 |
| 2018/0075368 A1* | 3/2018 | Brennan | G06N 5/022 |
| 2018/0095947 A1* | 4/2018 | Castelli | G06F 40/56 |
| 2018/0131645 A1* | 5/2018 | Magliozzi | G06F 40/30 |
| 2018/0137433 A1* | 5/2018 | Devarakonda | G16H 10/20 |
| 2018/0174020 A1* | 6/2018 | Wu | G06N 3/08 |
| 2018/0196796 A1* | 7/2018 | Wu | G06F 16/9024 |
| 2018/0232662 A1* | 8/2018 | Solomon | G06F 3/167 |
| 2018/0247648 A1* | 8/2018 | Nadimpalli | G10L 15/22 |
| 2018/0329957 A1* | 11/2018 | Frazzingaro | G06F 16/24564 |
| 2018/0336275 A1* | 11/2018 | Graham | G06F 16/635 |
| 2018/0336478 A1* | 11/2018 | Bostick | G06N 3/006 |
| 2018/0336894 A1* | 11/2018 | Graham | G10L 15/30 |
| 2018/0358001 A1* | 12/2018 | Amid | G06N 20/00 |
| 2018/0374480 A1* | 12/2018 | Wang | G10L 15/1815 |
| 2018/0374482 A1* | 12/2018 | Woo | G06F 3/167 |
| 2019/0012390 A1* | 1/2019 | Nishant | G06F 16/248 |
| 2019/0043483 A1* | 2/2019 | Chakraborty | G10L 15/16 |
| 2019/0065498 A1* | 2/2019 | Yuan | G06F 16/90332 |
| 2019/0095425 A1* | 3/2019 | Galitsky | G06F 40/30 |
| 2019/0102078 A1* | 4/2019 | Bhatt | G06F 3/04847 |
| 2019/0102378 A1* | 4/2019 | Piernot | G06F 40/295 |
| 2019/0103095 A1* | 4/2019 | Singaraju | G06N 20/10 |
| 2019/0103111 A1* | 4/2019 | Tiwari | G06F 16/3334 |
| 2019/0124020 A1* | 4/2019 | Bobbarjung | G06Q 20/123 |
| 2019/0147099 A1* | 5/2019 | Ginsberg | G10L 15/183 704/231 |
| 2019/0166069 A1* | 5/2019 | Yao | G06F 3/0486 |
| 2019/0180871 A1* | 6/2019 | Doerflinger | G16H 50/20 |
| 2019/0197053 A1* | 6/2019 | Graham | G06F 16/685 |
| 2019/0217206 A1* | 7/2019 | Liu | G06N 20/00 |
| 2019/0237061 A1* | 8/2019 | Rusak | G06F 40/247 |
| 2019/0244601 A1* | 8/2019 | Rusak | G10L 15/063 |
| 2019/0258710 A1* | 8/2019 | Biyani | G06F 40/253 |
| 2019/0295537 A1* | 9/2019 | Sapugay | G06N 20/00 |
| 2019/0303442 A1* | 10/2019 | Peitz | G10L 15/1815 |
| 2019/0325081 A1* | 10/2019 | Liu | G10L 15/183 |
| 2019/0325084 A1* | 10/2019 | Peng | G06Q 10/00 |
| 2019/0339784 A1* | 11/2019 | Lemay | G06F 1/3206 |
| 2019/0347326 A1* | 11/2019 | Kozhaya | G06F 40/35 |
| 2019/0354874 A1* | 11/2019 | Shah | G06N 5/02 |
| 2019/0361977 A1* | 11/2019 | Crudele | G06F 40/30 |
| 2019/0371296 A1* | 12/2019 | Iwase | G06F 40/295 |
| 2019/0377790 A1* | 12/2019 | Redmond | H04L 51/02 |
| 2020/0005117 A1* | 1/2020 | Yuan | G06N 3/006 |
| 2020/0051547 A1* | 2/2020 | Shanmugam | G06F 40/35 |
| 2020/0057946 A1* | 2/2020 | Singaraju | G06N 5/022 |
| 2020/0066255 A1* | 2/2020 | Madan | G10L 15/1815 |
| 2020/0073938 A1* | 3/2020 | Losalka | G06F 40/295 |
| 2020/0074984 A1* | 3/2020 | Ho | G10L 15/063 |
| 2020/0074991 A1* | 3/2020 | Yalla | G06F 40/284 |
| 2020/0081939 A1* | 3/2020 | Subramaniam | G06F 40/10 |
| 2020/0097814 A1* | 3/2020 | Devesa | G10L 15/1815 |
| 2020/0098366 A1* | 3/2020 | Chakraborty | G10L 15/1815 |
| 2020/0104357 A1* | 4/2020 | Bellegarda | G06N 3/0454 |
| 2020/0117709 A1* | 4/2020 | Galitsky | G06F 16/953 |
| 2020/0126540 A1* | 4/2020 | Panchamgam | G06F 16/24575 |
| 2020/0137230 A1* | 4/2020 | Spohrer | H04M 3/5191 |
| 2020/0142959 A1* | 5/2020 | Mallinar | G06N 20/00 |
| 2020/0143114 A1* | 5/2020 | Dua | G06N 20/00 |
| 2020/0143247 A1* | 5/2020 | Jonnalagadda | G06F 40/295 |
| 2020/0152173 A1* | 5/2020 | Smith | G10L 15/16 |
| 2020/0167604 A1* | 5/2020 | Shah | G06F 16/35 |
| 2020/0211536 A1* | 7/2020 | Shmueli-Scheuer | G10L 15/1815 |
| 2020/0219495 A1* | 7/2020 | Alkan | G10L 15/1815 |
| 2020/0294101 A1* | 9/2020 | Bell | G06N 3/006 |
| 2020/0342032 A1* | 10/2020 | Subramaniam | G10L 15/063 |
| 2020/0357409 A1* | 11/2020 | Sun | G10L 15/26 |
| 2020/0401422 A1* | 12/2020 | Liu | G06F 16/3322 |
| 2021/0004485 A1* | 1/2021 | Summers | G06F 21/6254 |

* cited by examiner

METHODS AND SYSTEMS FOR IMPROVING CHATBOT INTENT TRAINING BY CORRELATING USER FEEDBACK PROVIDED SUBSEQUENT TO A FAILED RESPONSE TO AN INITIAL USER INTENT

BACKGROUND OF THE INVENTION

Field of the Invention

The present invention relates in general to computing systems, and more particularly, to various embodiments for improving chatbot intent training.

Description of the Related Art

Chatbots, also known as talkbots, chatterbots, bots, instant messaging (IM) bots, interactive agents, Artificial Conversational Entities (ACEs), voice response systems, etc., are computer nodes (i.e., devices and/or programs) or artificial intelligence modules which are able to, for example, conduct conversations with individuals (or users) through auditory (e.g., speech/voice) or text-based methods. For example, users may ask questions, and the chatbot may respond based on its knowledge base and/or by analyzing the question, providing the best answer it can generate.

Chatbots are often trained with a set of "intents," each of which may be considered to refer to and/or be associated with what the user is "intending" to ask or command (i.e., what the user "means") with their utterance or spoken command. For example, a user may ask the chatbot for their current location using several different utterances. However, each of those different utterances may be associated with the same intent. After identifying the correct intent (e.g., the intent determined to have the highest confidence level based on the detected utterance), the system may provide an appropriate answer.

However, in some instances, the response generated by the system is not helpful to the user due to, for example, the selection of the wrong intent or due to the inability of the system to select a pre-trained or established intent with high confidence. Also, in cases in which the user utterance is determined to not match any of the established intents, the system may respond with a generic response (e.g., based on classifying the utterance to a "catch all" intent, such as an "anything else" intent), perhaps asking the user to restate and/or reword the utterance. If the user successfully does this, valuable feedback or additional training data may be considered to have been provided. However, few, if any, chatbot systems take advantage of such.

SUMMARY OF THE INVENTION

Various embodiments for managing chatbots are provided. Chatbot interaction information is received. At least one chatbot interaction within the received chatbot interaction information is identified. The at least one identified chatbot interaction includes an initial utterance provided by a user, an unsuccessful response generated responsive to the initial utterance, a subsequent utterance provided by the user, and a successful response generated responsive to the subsequent utterance. The successful response is associated with a chatbot intent. A confidence score for associating the initial utterance with utilization of the chatbot intent by a chatbot is calculated.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
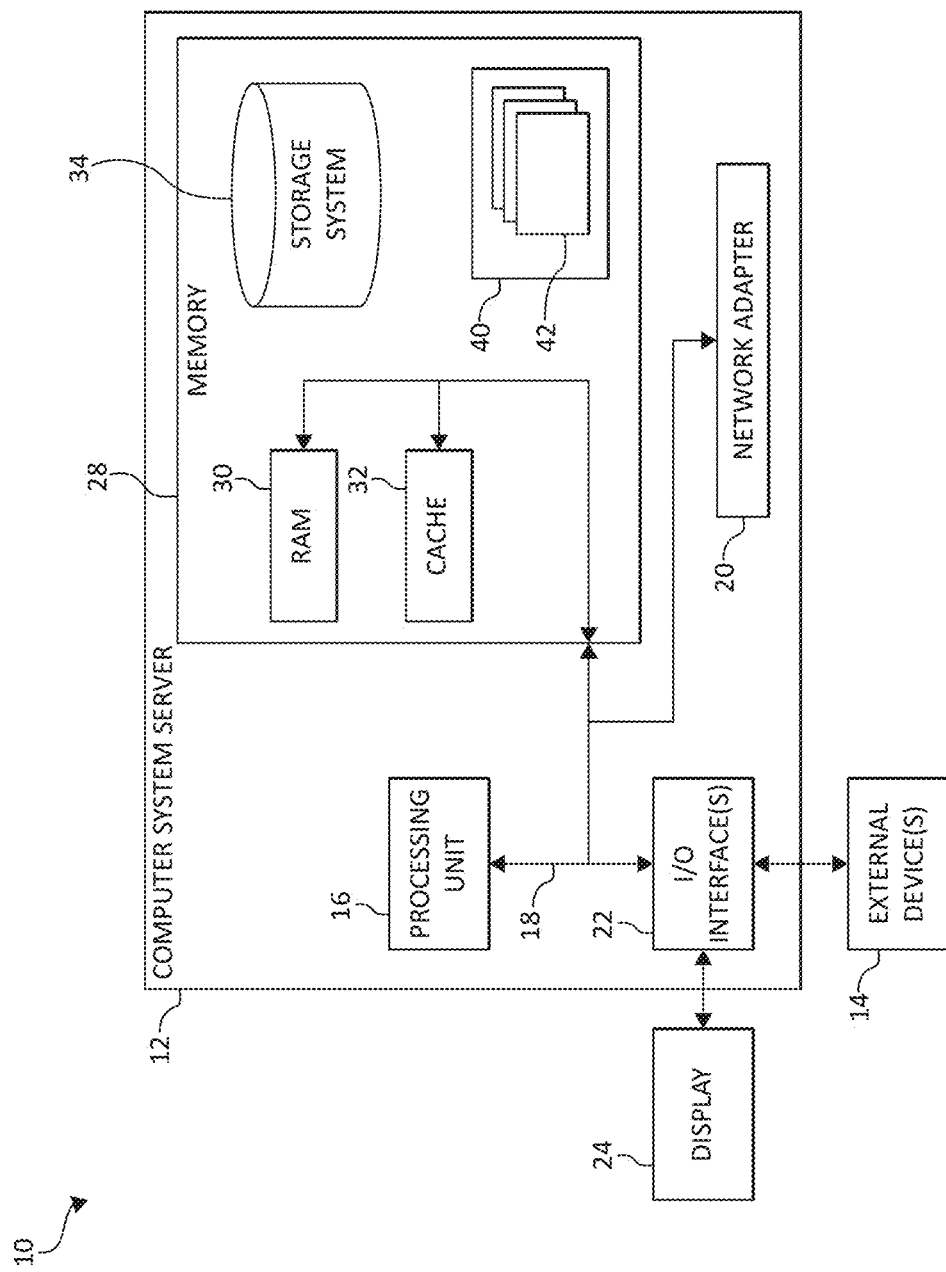
FIG. 1 is a block diagram depicting an exemplary computing node according to an embodiment of the present invention.

As discussed above, chatbots, also known as talkbots, chatterbots, bots, instant messaging (IM) bots, interactive agents, Artificial Conversational Entities (ACEs), voice response systems, etc., are computer nodes (i.e., devices, systems, and/or programs) or artificial intelligence modules which are able to, for example, conduct conversations with individuals (or users) through auditory (e.g., speech/voice) or text-based methods. For example, users may ask questions, and the chatbot may respond based on its knowledge base and/or by analyzing the question, providing the best answer it can generate.

Chatbots (or chatbot systems) are often trained with a set of "intents," each of which may be considered to refer to and/or be associated with what the user is "intending" to ask or command (i.e., what the user "means") with their utterance or spoken command and/or what the user is determined to be intending to ask/command. For example, a user may ask the chatbot for their current location in several different ways or using different utterances (e.g., such a question may be asked using different phraseologies). However, each of those utterances may be associated with the same intent (e.g., a "where am I" intent). After identifying the correct intent (e.g., the intent determined to have the highest confidence level based on the detected utterance), the system may provide an appropriate answer.

However, in some instances, the response generated by the system is not helpful to the user due to, for example, the selection of the wrong intent or the inability of the system to select an established intent with high confidence. Also, in cases in which the user utterance is determined to not match any of the trained intents, the system may generate a generic response (e.g., based on the utterance being classified to an "anything else" type intent), perhaps asking the user to restate and/or reword the utterance. If the user successfully does this, valuable feedback or additional training data may be considered to have been provided. However, few, if any, chatbot systems take advantage of such.

While chatbot administrators may parse chatbot logs to identify utterances with unsatisfactory responses, sorting through the data may be nearly as time-consuming and onerous as the initial training of the chatbot. What is needed is a way to quickly and easily find poorly classified utterances (e.g., short tail or short head utterances), which would allow for improving the quality of the classification of utterances and/or the identification of appropriate intents.

To address these needs and/or the shortcomings in the prior art, in some embodiments described herein, methods and/or systems are disclosed that, for example, manage chatbots (and/or other similar systems) in such a way to improve the existing intents (and/or the training thereof) utilized by the classifier within the system. In some embodiments, new utterances are identified and associated with intents. In some embodiments, the new utterances may be considered to be short tail utterances (as opposed to long tail utterances), as will be appreciated by one skilled in the art. The new utterances may be associated with (or "linked" to) previously existing intents such that when/if the utterances (or similar utterances) are later detected or received by the system, the system responds utilizing the appropriate response(s) to those intents.

In some embodiments, user interactions (i.e., the interactions of one or more users with one or more chatbot systems) are searched (or "mined") for utterance-intent pairs (e.g., an utterance and the response generated by the system) that are determined to be unsatisfactory to the user, which are utilized as training data to improve system performance/operation. The utterance-intent pairs may be scored against subsequent utterance-intent pairs (e.g., immediately after, occurring within a predetermined amount of time, number of utterances/phrases, etc.) to determine relevance within the conversation or interaction. A relevance (or confidence) scoring may then be performed with similar pairs from other conversations.

In particular, in some embodiments, previous multiple-utterance interactions between users and chatbot systems are identified and perhaps utilized to improve the performance of chatbot systems. Multiple-utterance interactions may refer to interactions between one or more user and one or more chatbot in which the initial response generated by the chatbot(s) is (or was) determined to be unsatisfactory to the user(s) (or "unsuccessful") such that the user provides at least one subsequent utterance, perhaps in order to receive the desired response. The initial response generated by the chatbot may be determined to be unsatisfactory (or unsuccessful) based on, for example, the initial utterance being classified to a particular type of intent, such as an "anything else" (or similar "catch all" type) intent, a subsequent utterance being provided to by the user (and/or the content thereof), and/or the system receiving negative feedback (e.g., from the user) associated with the initial response.

An exemplary multiple-utterance interaction may be an interaction in which the user provides a first utterance, the chatbot system generates a response to the first utterance, and the user then provides a second utterance that indicates that they are not satisfied with the response. In some instances, the chatbot then generates a second response which may be determined to be satisfactory to the user. The second response generated by the chatbot may be determined to be satisfactory based on, for example, the second utterance being classified to a particular type of established intent (e.g., besides a "catch all" type of intent), such as a "where are you" intent, a subsequent utterance provided by the user (e.g., "Thank you"), and/or the system receiving positive feedback (e.g., from the user) associated with the second response. Multiple-utterance interactions may be considered to be "successful" if the second (or third, fourth, etc.) response generated by the chatbot is determined to be satisfactory.

In some embodiments described herein, such interactions, particularly successful multiple-utterance interactions, may be utilized to improve the performance of chatbots by, for example, linking (or associating) the first (or initial) utterance to (or with) the second (or other subsequent) response and/or the corresponding intent. As a result, if the first utterance (or a subsequent instance thereof) is later provided to a chatbot, the system may classify the utterance to this intent and thus generate an appropriate response utilizing the intent (e.g., a subsequent instance of the second (or other subsequent) response, as opposed to again generating the first response).

More particularly, in some embodiments, a list of (new) utterances (or at least one utterance) that may be incorporated into (additional) training for the chatbot (and/or particular chatbot intents) may be generated. The utterances may be collected and clustered (e.g., automatically) to find groupings of similar questions or commands (or utterances). The new clusters may be compared to pre-existing or established intents in order to determine if they should be added to an already existing intent. In this manner, the system may improve (or "grow") over time automatically by making current, established intents more robust or flexible.

At least some of the aspects of functionality described herein may be performed utilizing a cognitive analysis (or machine learning technique). The cognitive analysis may include natural language processing (NLP) or a NLP technique, such classifying natural language, analyzing tone, and analyzing sentiment (e.g., scanning for keywords, key phrases, etc.) with respect to, for example, content (or data), communications sent to and/or received by users, and/or other available data sources. In some embodiments, natural language processing (NLP), Mel-frequency cepstral coefficients (MFCCs) (e.g., for audio content detected by a microphone), and/or region-based convolutional neural network (R-CNN) pixel mapping (e.g., for object detection/classification in images/videos), as are commonly understood, are used.

The processes described herein may utilize various information or data sources associated with users and/or content (e.g., utterances, communications, etc.). With respect to users, the data sources may include, for example, any available data sources associated with the user. For example, in some embodiments, a profile (e.g., a cognitive profile) for the user(s) may be generated. Data sources that may be use used to generate a cognitive profile for the user(s) may include any appropriate data sources associated with the user that are accessible by the system (perhaps with the permission or authorization of the user). Examples of such data sources include, but are not limited to, communication sessions and/or the content (or communications) thereof (e.g., chatbot interactions, phone calls, video calls, text messaging, emails, in person/face-to-face conversations, etc.), a profile of (or basic information about) the user (e.g., job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, managing chatbots and/or the operation thereof, as described herein. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or administrators may also be utilized, which may allow for the performance of the system to further improve with continued use.

It should be understood that as used herein, the term "computing node" (or simply "node") may refer to a computing device, such as a mobile electronic device, desktop computer, etc. and/or an application, such as a chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by such computing devices.

Additionally, although particular embodiments and examples described herein may describe chatbot systems as being utilized via spoken or audible communications (e.g., utterances), it should be understood that the methods and systems described herein may be applied to similar systems in which the communications are provided via text-based methods (e.g., using a keyboard). Further, it should be understood that the methods and systems described herein may be applicable to any computing system/device or application that performs various types of tasks (e.g., besides answering questions, conducting conversations, etc.) in response to receiving such communications, such as controlling IoT devices, playing media, placing online orders, etc.

In particular, in some embodiments, a method for managing a chatbot is provided. Chatbot interaction information is received. At least one chatbot interaction within the received chatbot interaction information is identified. The at least one identified chatbot interaction includes an initial utterance provided by a user, an unsuccessful response generated responsive (or in response) to the initial utterance, a subsequent utterance provided by the user, and a successful response generated responsive to the subsequent utterance. The successful response is associated with a chatbot intent. A confidence score for associating the initial utterance with utilization of the chatbot intent by a chatbot is calculated.

The initial utterance may be incorporated into (or utilized in) training data for the utilization of the chatbot intent by the chatbot if the calculated confidence score exceeds a predetermined threshold. The chatbot may be caused to generate a response utilizing the chatbot intent responsive to detecting an instance of the initial utterance. Before the calculating of the confidence score, the initial utterance may be unassociated with (or not linked to) the chatbot intent.

The calculating of the confidence score may be performed utilizing a cognitive analysis. For example, the calculating of the confidence score may be performed utilizing a clustering algorithm based on a "ground truth" utilized by the chatbot.

The subsequent utterance may be at least a third (as opposed to a second) utterance provided by the user within the at least one identified chatbot interaction. The successful response may be at least a third (as opposed to a second) response generated within the at least one identified chatbot interaction.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc., or any other computing system/device through which a chatbot may be implemented or utilized. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
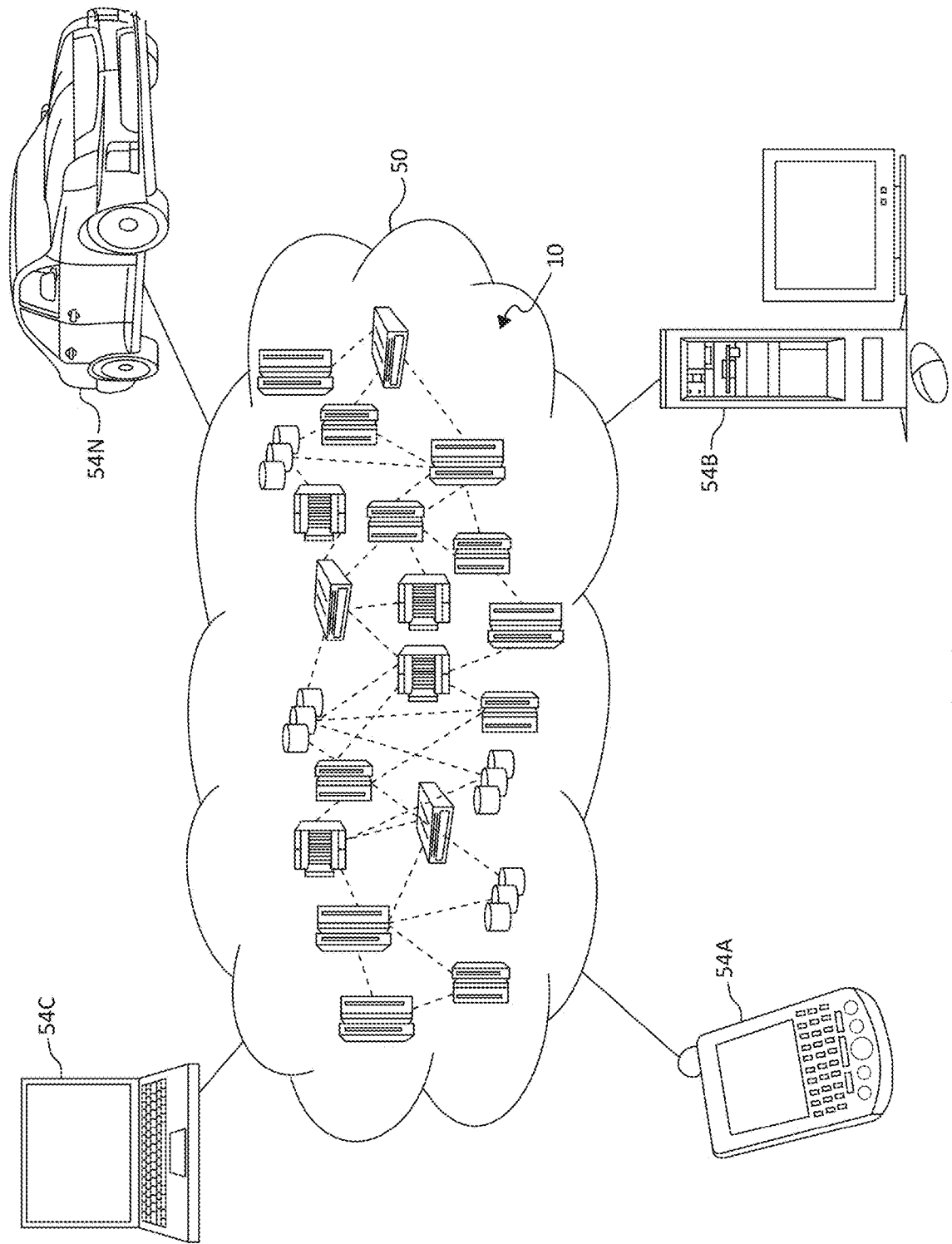
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
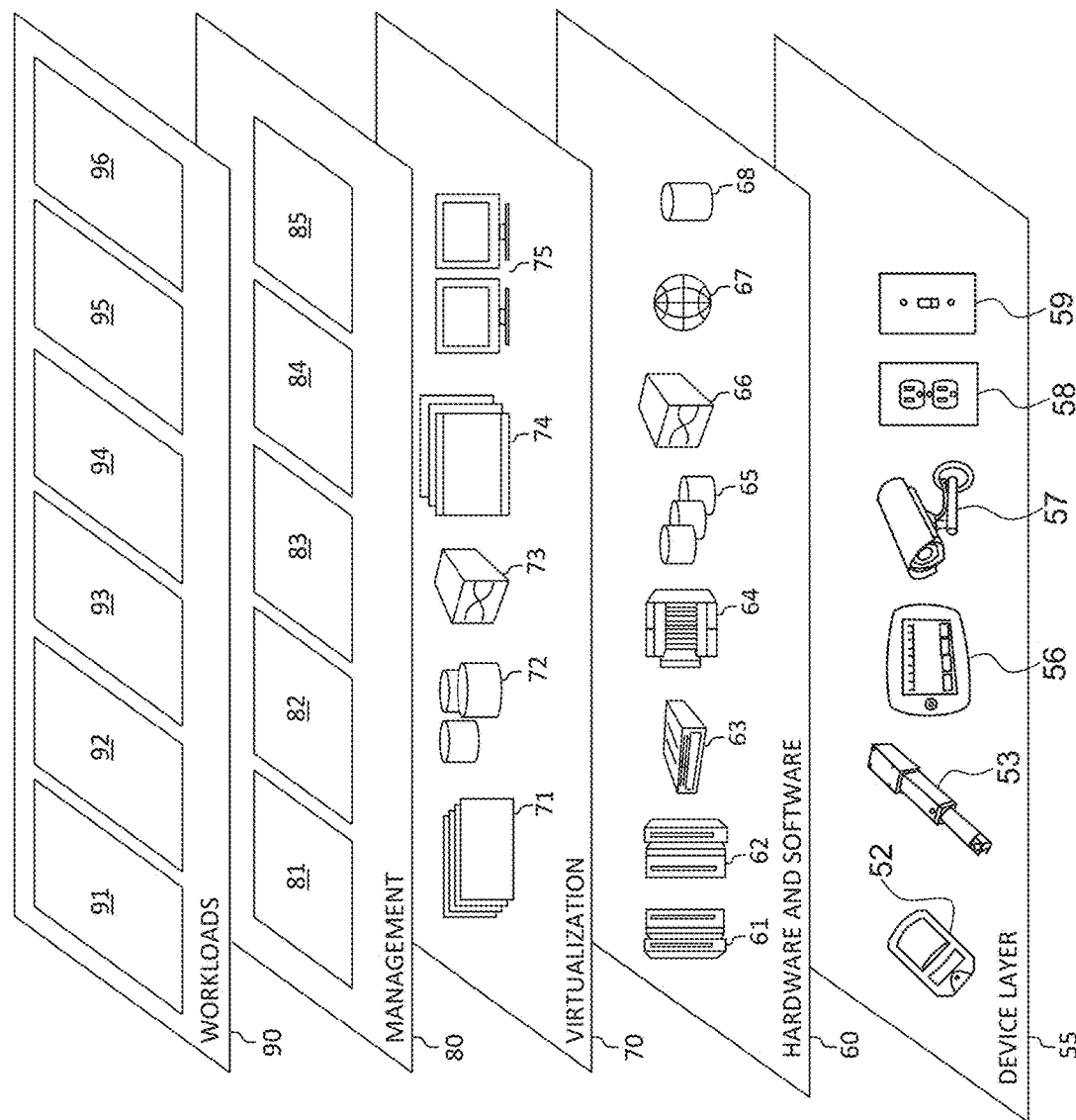
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing chatbots, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and/or systems are provided that, for example manage chatbots (and/or other similar systems) in such a way to improve the existing intents (and/or the training thereof) utilized by the classifier within the system. In some embodiments, new utterances are identified and associated with established intents (i.e., utterances are associated with/linked to intents with which they were previously unassociated). As such, in some instances, when/if the utterances (or similar utterances) are later detected/received, the chatbot may respond utilizing the appropriate response(s) to those intents.

In some embodiments, one or more chatbot system is initially trained using, for example, standard classification techniques, as is commonly understood in the art. The training may include, for example, generating (or "building") one or more intents (e.g., n intents). The intents may include intents that are associated with generating responses, such as answering questions, conducting conversations, etc. (or a first type of intent or first intents), as well as intents that are associated with the system not being able to understand utterances, dissatisfied users, etc. (e.g., an "anything else" intent, an "opt out" intent, an "unhappy user" intent, etc.) (or a second type of intent or second intents). The training may also include building dialogue (or other response) that is to be utilized by the system when responding to utterances (e.g., based on the intent identified/selected after an utterance has been detected).

For example, the intents may include an "anything else" intent (or node) which is utilized when the system determines that the detected utterance does not match any other intents (at least above a predetermined confidence score), which may be case when the system is not able to understand or process a detected (or received) utterance. As a specific example of dialogue that may be utilized in response to such a situation, the system may reply with "I'm sorry, but I don't understand. Can you please rephrase the question?" As another example, the system may reply with "I didn't understand. You can ask me things such as X, Y, or Z" (e.g., where X, Y, and Z are sample questions that are linked with established intents).

After the chatbot system(s) has been appropriately trained and utilized (e.g., one or more user has provided questions, commands, etc. and the chatbot has generated responses), data (or information) associated with the utilization of the chatbot system is collected (or gather, received, etc.). The data may include all (or at least some) of the interactions that have taken place utilizing the system(s) and/or logs, records, etc. thereof that have been generated and stored during the utilization of the chatbot(s). It should be noted that in some embodiments the data collected may be associated with multiple chatbot systems (or multiple instances of chatbots) deployed with multiple computing devices and utilized by multiple users (e.g., the data may be "crowdsourced").

Within the collected data, all (or at least some) of the instances in which utterances are determined to have been responded to in an unsatisfactory manner are identified (or gathered, tagged, etc.). In other words, in some embodiments, the instances in which the data indicates that the (respective) user is (or was) not satisfied with the response generated by the chatbot(s) are identified. Various types of interactions may be indicative of such situations. Examples may include an utterance (or initial utterance ($U_i$)) being classified to one of the second intents, such as an "anything else" intent (e.g., the confidence score was not sufficiently high with respect to any of the first type of intents). Other examples may include an utterance being determined to be an "off topic" utterance (e.g., "You stupid bot!") that is classified to an "unhappy user" intent, an utterance being determined to indicate that the user wants to end the interaction (and perhaps speak to a human responder) (e.g., "Operator, please . . . ") that is classified to an "opt out" intent, and a response to an utterance receiving negative feedback (e.g., a "downvote").

For each of the identified instances (or interactions), a successful response within (or associated with) the interaction is identified (if available, if such occurred, etc.). For example, in some embodiments, the next successful response (e.g., after the initial utterance, after the initial response, after a second response, etc.) is identified. In other words, in some embodiments, for each of the identified interactions, the next utterance ($U_i+X$) after the initial utterance, which is successfully matched to a first type of intent (and/or for which an appropriate/successful response is generated and/or besides a "catch all" type of intent) is identified (or tagged, etc.). However, it should be understood that in some embodiments, the "next" utterance may not be the utterance that immediately follows the initial utterance and/or the initial response. Rather, the interactions may include a series of utterances (and/or responses), and the system may not be able to classify the first several utterances to any established intent (e.g., the first utterance that the system is able to classify to one of the first intents may be, for example, the third, fourth, etc. utterance in the interaction). As described herein, in some instances, the success of this subsequent utterance may be utilized to indicate that the initial utterance may be utilized to train the system (and/or the system intents).

In some embodiments, a score (or grade) is calculated (or determined) for each of the identified interactions (i.e., those in which a latter, successful utterance is identified) and/or the initial utterances of those interactions. The score may be considered to be a confidence score or a relevancy score (e.g., how relevant the initial utterance is/was to the first utterance that is/was successfully classified). The calculating of the score may be performed utilizing a cognitive analysis or machine learning technique.

For example, for each of the interactions, a tuple may be created in a staging table (T). The tuple may include the initial utterance and the intent to which the subsequent utterance is classified (e.g., [Ui, Ui+X's intent]). The staging table may include a large set of potential training data for the chatbot and/or the intents thereof. In some embodiments, a clustering-based validation is utilized to select from the available training data. For example, a clustering algorithm may be trained on all of the tuples in the staging table along with the "ground truth" (GT), as will be appreciated by one skilled in the art, already utilized by the chatbot system. The cluster size (or number) may be the number of established intents (n).

The tuples may be sorted by the confidence (or confidence score) of the clusters, as calculated by the clustering algorithm. The tuples with scores over a predetermined threshold (or a predetermined number of those with the highest scores) may be selected, and a report or record thereof may be generated, with for example, the cluster centroids of the clusters being highlighted or other indicated. In some embodiments, an administrator (or other human responder, personnel, etc.) may utilize the M centroids and validate the intent(s) based on the clustered intents. Validated utterances may be added to the chatbot training set, and the chatbot classifier may then be appropriately retrained (e.g., associating the newly validated utterances with established intents). However, in some embodiments, the system and/or classifier may be automatically retrained utilizing utterances for which the calculated scores exceed a predetermined threshold (i.e., without the human intervention).

As an exemplary scenario in which the methods and systems described herein may be utilized, assume three users (e.g., User 1, User 2, and User 3) have interacted with a chatbot system that is configured to generate responses related to a particular subject matter or entity, the International Space Station (ISS). As such, it should be understood that the interactions described below include questions from the users that are concerning the ISS. However, the methods and system described herein may be applied to any chatbot system (or any other similar system, such as voice response systems, etc.). In the example provided, it should be assumed that four intents have been established within the chatbot system: "what are you," "where are you," "anything else," and "opt out."

Figure 4:
FIG. 4 is table showing the content of several interactions between users and a chatbot system according to an embodiment of the present invention.

FIG. 4 shows a table 400 that describes the interactions between Users 1-3 and the chatbot by listing utterances provided by the users and responses generated by the chatbot in response to the utterances (i.e., data associated with previous utilization of the chatbot, a log of interactions, etc.). For example, a first utterance (U1) provided by User 1 includes the question "Are you above me?," and a first response (R1) generated by the chatbot in response to the first utterance includes "I don't understand. Please rephrase" (e.g., based on U1 being classified to the "anything else" intent). In the same interaction, a second utterance (U2) provided by User 1 includes "Where are you located?," and a second response (R2) generated by the chatbot includes "I am at XYZ location" (e.g., based on U2 being classified to the "where are you" intent). Similarly, the interactions of User 2 and User 3 include the utterances and responses shown in FIG. 4.

Based on the interactions shown in FIG. 4, according to some aspects of functionality described herein, the utterances "Are you above me?" and "Are you above?" may be linked to or associated with the "where are you" intent due to the successful nature of the corresponding interactions utilizing the process described above. That is, both User 1 and User 2 were able to receive the desired response after providing the respective second utterances. In contrast, the utterance "Are you above me now" (i.e., provided by User 3) may not be linked to/associated with any additional intents, as the utilization of the "opt out" intent may indicate that the interaction of User 3 was not successful.

With respect to the interactions of User 1 and User 2, a score for each of the interactions (and/or the first utterances thereof) may be calculated as described above. For example, a tuple for User 1 (and/or the interaction thereof with the chatbot) may be expressed as ["Are you above me?", #where_are_you], while a tuple for User 2 may be expressed as ["Are you above?", #where_are_you]. A clustering algorithm may then be utilized with the input thereof being the tuples of User 1 and User 2 along with the ground truth utilized by the chatbot system (e.g., where the cluster size is the same as the number of established intents).

As one example, assume that a confidence score of 70% is calculated for the tuple of User 1 with respect to the "where are you" intent, and a confidence score of 65% is calculated for the tuple of User 2 with respect to the "where are you" intent. A sorting algorithm may then be utilized to sort the tuples (e.g., based on the calculated scores). In some embodiments, a predetermined threshold may be applied such that only those tuples (or utterances) above a predetermined threshold are selected and, for example, included in a report that may be provided to an administrator. For example, if the threshold is set to 70%, only the tuple of User 1 is included, perhaps along with a sample utterance from the cluster associated with the "where are you" intent, which may be utilized by the administrator to determine if the first utterance of User 1 should be utilized as training data (e.g., to be associated with/linked to the "where are you" intent). However, as described above, in some embodiments, this process may be performed automatically (e.g., solely based on the threshold, etc.).

It should be noted that in some embodiments or scenarios, the system may determine that the user is (or was) dissatisfied with a generated response based on an utterance being classified to an intent other than an "anything else" type of intent (or one of the other second intents) and utilize subsequent responses and utterances in a manner similar to that described above. For example, again considering the chatbot system described above (e.g., configured to provide information related to the ISS), assume that a first utterance (U1) provided by the user includes "What is the International Space Station location?," which the system then (perhaps "incorrectly") classifies to the "what are you" intent (as opposed to the "where are you" intent or the "anything else" intent). As such, the system generates a first response (R1) that includes "The International Space Station (ISS) is a space station, or a habitable artificial satellite, in low Earth orbit. Its first component launched into orbit in 1998, and the last pressurized module was fitted in 2011. The station is expected to operate until at least 2028. Development and assembly of the station continues, with components scheduled for launch in 2018 and 2019."

The user then provides a second utterance (U2) that includes "You stupid bot!" The system may classify such an utterance to the "anything else" (or "unhappy user") intent, and generate second response (R2) such as "I'm sorry I didn't understand. Can you rephrase?" The user then replies with a third utterance (U3) that includes "Where is the ISS station now?," which the system classifies to the "where are you" intent. The system then generates a third response (R3) that includes "I am at XYZ location."

The system may utilize such interactions to link the first utterance (e.g., "What is the International Space Station location?") to the third response (e.g., "I am at XYZ location.") (and/or the corresponding intent) based on the second utterance (e.g., "You stupid bot!") and/or the second response (e.g., "I'm sorry I didn't understand. Can you rephrase?") (and/or the corresponding intent).

As another example utilizing the same chatbot system described above, consider a first utterance provided by a user that includes "Are you above me?," which is classified to the "anything else" intent," resulting in the system generating an appropriate first response. The user then provides a second utterance that includes "Are you near me?," which is again classified to the "anything else" intent, again resulting in a similar, second response being generated. In reply, the user then provides a third utterance that includes "Are you near the United States?," which is yet again classified to the "anything else" intent, yet again resulting in a similar, third response being generated. The user then provides a fourth utterance of "Where are you?," which is classified to the "where are you" intent. The system then generates a fourth response that includes the location of the ISS.

The system may utilize such interactions to link the first utterance (e.g., "Are you above me?") to the fourth response (e.g., "I am at XYZ location.") (and/or the corresponding intent) based on the chain of utterances/responses described above. As such, it should also be noted that in some embodiments/scenarios, strings of multiple (e.g., more than two) pairs of utterances and generated responses (and/or the corresponding intents) may be utilized to link utterances to responses (and/or intents).

Figure 5:
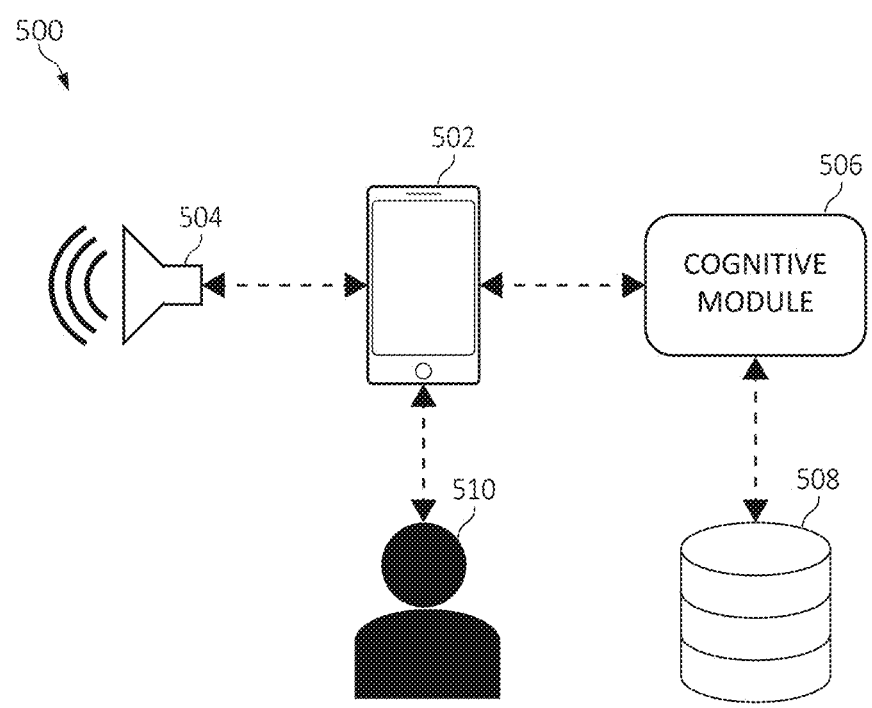
FIG. 5 is a block diagram of a computing environment according to an embodiment of the present invention.

Referring now to FIG. 5, an exemplary environment (e.g., computing environment or chatbot system) 500, in which embodiments of the present invention may be implemented, is shown. The environment includes (and/or has therein) a computing device 502, a speaker 504, a cognitive module 506, and a database 508. The computing device 502 may be any suitable computing device in or through which a chatbot may be implemented. In the example shown, the computing device 502 is a mobile electronic device (e.g., a mobile phone). Although not shown, the computing device 502 may include a microphone that may be used to detect or receive utterances (e.g., voice commands, communications, questions, etc.). However, it should be understood that in some embodiments, communications may (also) be received through text-based methods (e.g., via a keyboard or touch pad on the computing device 502).

The speaker 504 may be any suitable electro-acoustic transducer (or loudspeaker) that is configured to render auditory (or audible or aural) responses from the chatbot. Although shown as a separate component, it should be understood that the speaker 504 may be integrated with the computing device 502, or another computing device, such as a desktop PC, audio system, smart television, etc.

The cognitive module 506 may include any suitable computing system or device that may be configured to perform the functionality described herein. Although shown as a separate component (e.g., remotely located, on the "cloud," etc.), the cognitive module 506 may be (at least partially) integrated with the computing device 502. The cognitive module 506 is in operable communication (either directly or indirectly) with the computing device 502, the speaker 504, and the database 508. The database 510 may include any suitable memory or storage device (e.g., on the cloud) for storing data related to, for example, previous chatbot interactions.

Figure 6:
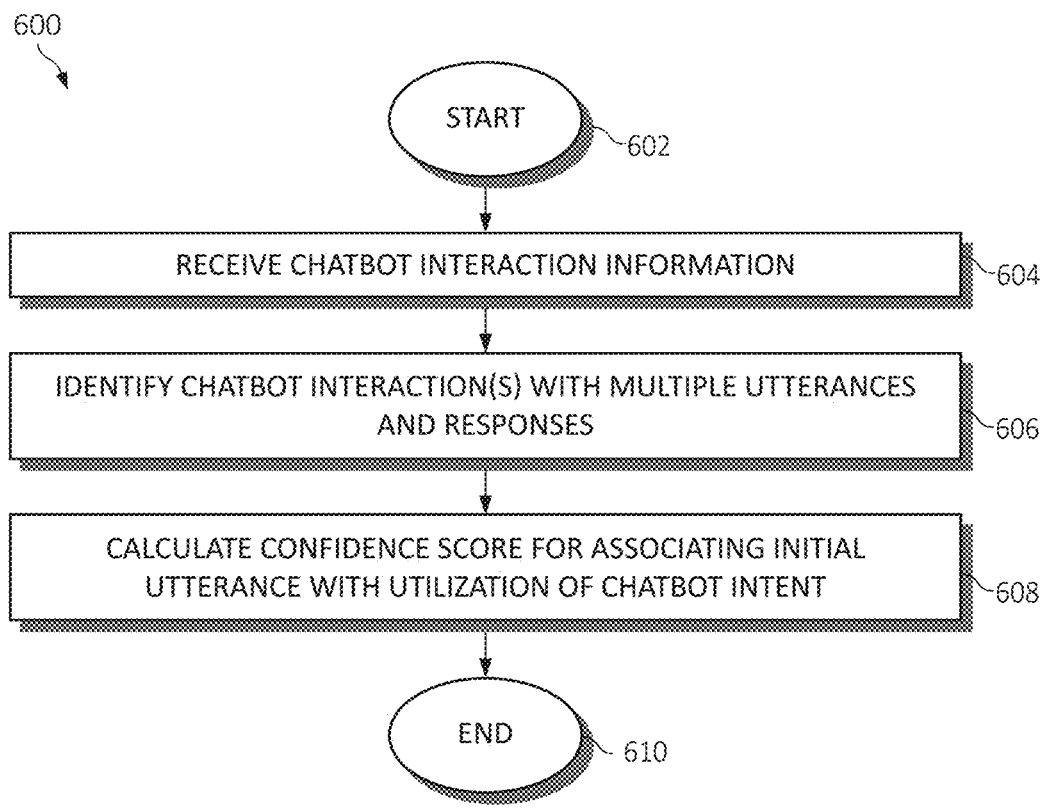
FIG. 6 is a flowchart diagram of an exemplary method for managing chatbots according to an embodiment of the present invention.

Turning to FIG. 6, a flowchart diagram of an exemplary method 600 for managing chatbots is provided. The method 600 begins (step 602) with, for example, one or more chatbots being implemented and utilized by one or more users through multiple chatbot interactions and information related thereto (e.g., records, logs, etc. of the interactions or chatbot interaction information) being stored.

The chatbot interaction information is received (step 604). For example, the chatbot interaction information may be received or retrieved by a computing device or system performing the functionality described herein (e.g., a cognitive module). The chatbot interaction information may include information or data related to multiple interactions between one or more user and one or more chatbot system.

At least one chatbot interaction (e.g., with multiple utterances and responses) within the received chatbot interaction information is identified (step 606). The at least one identified chatbot interaction may include an initial utterance provided by a user, an unsuccessful response generated responsive (or in response) to the initial utterance, a subsequent utterance provided by the user, and a successful response generated responsive to the subsequent utterance, as described above. The successful response may be associated with a chatbot intent (e.g., a first type of intent, such as "where are you," "what are you," etc. as opposed to a "catch all" or second type of intent, such as "anything else"), and (at least before the calculating of the confidence score described herein) the initial utterance may be unassociated with (or not linked to) the chatbot intent. The subsequent utterance may be at least a third (as opposed to a second) utterance provided by the user within the at least one identified chatbot interaction. The successful response may be at least a third (as opposed to a second) response generated within the at least one identified chatbot interaction.

A confidence score for associating the initial utterance with utilization of the chatbot intent by a chatbot is calculated (step 608). The calculating of the confidence score may be performed utilizing a cognitive analysis. For example, the calculating of the confidence score may be performed utilizing a clustering algorithm based on a ground truth utilized by the chatbot.

Method 600 ends (step 610) with, for example, the initial utterance being incorporated into (or utilized in) training data for the utilization of the chatbot intent by the chatbot (e.g., if the calculated confidence score exceeds a predetermined threshold). In such a scenario, the chatbot may be caused (e.g., during future/subsequent use) to generate a response utilizing the chatbot intent responsive (or in response) to detecting an instance of the initial utterance (e.g., generate an instance of the successful response responsive to detecting an instance of the initial utterance). In some embodiments, feedback from users may (also) be utilized to improve the performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for managing a chatbot, by a processor, comprising:
   receiving chatbot interaction information of historical multi-utterance interactions between users and the chatbot;
   identifying at least one chatbot interaction from within the historical multi-utterance interactions within the received chatbot interaction information, wherein the at least one identified chatbot interaction comprises at least an initial utterance of the at least one chatbot interaction provided by a user to a chatbot, an unsuccessful response generated by the chatbot responsive to the initial utterance, a subsequent utterance provided by the user to the chatbot responsive to the unsuccessful response, and a successful response generated by the chatbot responsive to the subsequent utterance, and wherein the successful response is associated with a chatbot intent;

calculating a confidence score for associating the initial utterance with utilization of the chatbot intent by the chatbot, wherein the at least one identified chatbot interaction is further identified as being categorized by the chatbot as initially having an initial intent associated with the initial utterance classified by the chatbot as not belonging to an established class of intent based on the initial utterance, and wherein the established class of intent is adjusted after the successful response to include the initial utterance to link the initial utterance to the chatbot intent of the established class of intent after the chatbot used the initial intent to produce the unsuccessful response to the initial utterance when the calculated confidence score exceeds a predetermined threshold; and incorporating the initial utterance into training data to perform the linking of the initial utterance to the established class of intent for the utilization of the chatbot intent by the chatbot according to the calculated confidence score exceeding the predetermined threshold.

2. The method of claim 1, further comprising causing the chatbot to generate a response utilizing the chatbot intent responsive to detecting an instance of the initial utterance.

3. The method of claim 1, wherein before the calculating of the confidence score, the initial utterance is unassociated with the chatbot intent.

4. The method of claim 1, wherein the calculating of the confidence score is performed utilizing a cognitive analysis.

5. The method of claim 4, wherein the calculating of the confidence score is performed utilizing a clustering algorithm based on a ground truth utilized by the chatbot.

6. The method of claim 1, wherein the subsequent utterance is at least a third utterance provided by the user within the at least one identified chatbot interaction, and the successful response is at least a third response generated within the at least one identified chatbot interaction.

7. A system for managing a chatbot comprising:

a processor executing instructions stored in a memory device, wherein the processor:

receives chatbot interaction information of historical multi-utterance interactions between users and the chatbot;

identifies at least one chatbot interaction from within the historical multi-utterance interactions within the received chatbot interaction information, wherein the at least one identified chatbot interaction comprises at least an initial utterance of the at least one chatbot interaction provided by a user to a chatbot, an unsuccessful response generated by the chatbot responsive to the initial utterance, a subsequent utterance provided by the user to the chatbot responsive to the unsuccessful response, and a successful response generated by the chatbot responsive to the subsequent utterance, and wherein the successful response is associated with a chatbot intent;

calculates a confidence score for associating the initial utterance with utilization of the chatbot intent by the chatbot, wherein the at least one identified chatbot interaction is further identified as being categorized by the chatbot as initially having an initial intent associated with the initial utterance classified by the chatbot as not belonging to an established class of intent based on the initial utterance, and wherein the established class of intent is adjusted after the successful response to include the initial utterance to link the initial utterance to the chatbot intent of the established class of intent after the chatbot used the initial intent to produce the unsuccessful response to the initial utterance when the calculated confidence score exceeds a predetermined threshold; and incorporates the initial utterance into training data to perform the linking of the initial utterance to the established class of intent for the utilization of the chatbot intent by the chatbot according to the calculated confidence score exceeding the predetermined threshold.

8. The system of claim 7, wherein the processor further causes the chatbot to generate a response utilizing the chatbot intent responsive to detecting an instance of the initial utterance.

9. The system of claim 7, wherein before the calculating of the confidence score, the initial utterance is unassociated with the chatbot intent.

10. The system of claim 7, wherein the calculating of the confidence score is performed utilizing a cognitive analysis.

11. The system of claim 10, wherein the calculating of the confidence score is performed utilizing a clustering algorithm based on a ground truth utilized by the chatbot.

12. The system of claim 7, wherein the subsequent utterance is at least a third utterance provided by the user within the at least one identified chatbot interaction, and the successful response is at least a third response generated within the at least one identified chatbot interaction.

13. A computer program product for managing a chatbot, by a processor, the computer program product embodied on a non-transitory computer-readable storage medium holding computer program instructions executed by the processor and operative to:

receive chatbot interaction information of historical multi-utterance interactions between users and the chatbot;

identify at least one chatbot interaction from within the historical multi-utterance interactions within the received chatbot interaction information, wherein the at least one identified chatbot interaction comprises at least an initial utterance of the at least one chatbot interaction provided by a user to a chatbot, an unsuccessful response generated by the chatbot responsive to the initial utterance, a subsequent utterance provided by the user to the chatbot responsive to the unsuccessful response, and a successful response generated by the chatbot responsive to the subsequent utterance, and wherein the successful response is associated with a chatbot intent;

calculate a confidence score for associating the initial utterance with utilization of the chatbot intent by the chatbot, wherein the at least one identified chatbot interaction is further identified as being categorized by the chatbot as initially having an initial intent associated with the initial utterance classified by the chatbot as not belonging to an established class of intent based on the initial utterance, and wherein the established class of intent is adjusted after the successful response to include the initial utterance to link the initial utterance to the chatbot intent of the established class of intent after the chatbot used the initial intent to produce the unsuccessful response to the initial utterance when the calculated confidence score exceeds a predetermined threshold; and incorporate the initial utterance into training data to perform the linking of the initial utterance to the established class of intent for the utilization of the chatbot intent by the chatbot according to the calculated confidence score exceeding the predetermined threshold.

14. The computer program product of claim 13, wherein the computer program instructions executed by the processor are further operative to cause the chatbot to generate a response utilizing the chatbot intent responsive to detecting an instance of the initial utterance.

15. The computer program product of claim 13, wherein before the calculating of the confidence score, the initial utterance is unassociated with the chatbot intent.

16. The computer program product of claim 13, wherein the calculating of the confidence score is performed utilizing a cognitive analysis.

17. The computer program product of claim 16, wherein the calculating of the confidence score is performed utilizing a clustering algorithm based on a ground truth utilized by the chatbot.

18. The computer program product of claim 13, wherein the subsequent utterance is at least a third utterance provided by the user within the at least one identified chatbot interaction, and the successful response is at least a third response generated within the at least one identified chatbot interaction.

* * * * *